United States Patent
Peng

(10) Patent No.: US 6,786,534 B1
(45) Date of Patent: Sep. 7, 2004

(54) AUTOMOTIVE BODY SIDE IMPACT CONTROL SYSTEM

(75) Inventor: Zheng James Peng, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/250,011

(22) Filed: May 28, 2003

(51) Int. Cl.⁷ .................................................. B60J 7/00
(52) U.S. Cl. ............................ 296/187.08; 296/187.12
(58) Field of Search ........................ 296/187.03, 187.08, 296/187.12, 193.07, 204, 193.05, 203.03

(56) References Cited

U.S. PATENT DOCUMENTS

| | | | |
|---|---|---|---|
| 4,836,321 A | * | 6/1989 | Baumann .................... 180/232 |
| 5,431,476 A | | 7/1995 | Torigaki |
| 5,915,775 A | * | 6/1999 | Martin et al. ............... 296/35.2 |
| 5,947,223 A | * | 9/1999 | Rebmann ..................... 180/232 |
| 6,206,460 B1 | * | 3/2001 | Seeliger et al. ............. 296/204 |
| 6,220,652 B1 | | 4/2001 | Browne et al. |

* cited by examiner

Primary Examiner—Joseph D. Pape
(74) Attorney, Agent, or Firm—Gigette Bejin

(57) ABSTRACT

An automotive body includes a floor pan and a door for accessing a passenger compartment, a cross member attached to the floor pan and extending laterally under the floor pan, and a longitudinally extending frame rail underlying the floor and cross member. A flexible tensile member fastened between the frame rail and the cross member arrests lateral displacement of the door relative to the frame rail resulting from side impact upon the door.

17 Claims, 5 Drawing Sheets

AUTOMOTIVE BODY SIDE IMPACT CONTROL SYSTEM

BACKGROUND OF INVENTION

1. Field of the Invention

The present invention relates to an energy management control system for handling a side impact upon an automotive vehicle body.

2. Disclosure Information

As the quest for more sophisticated automotive collision energy management systems continues, side impact considerations persist. The Insurance Institute for Highway Safety (IIHS) has proposed a test using a heavy (1,500 kgs) barrier which would be impacted into the bodyside of the vehicle at 50 kph. This test presents a severe challenge to the bodyside structure of a vehicle because of the crushing force and energy which would be imposed upon the vehicle during the test. The proposed test thus presents an issue to designers concerned with the construction of an affordable body system capable of generating large resistance forces to oppose an incoming IIHS barrier, but at an affordable cost.

The present system takes advantage of the strength inherent in the frame rails and body cross members found on conventional body and frame vehicles to reduce the intrusion of the IIHS barrier into the passenger compartment of a vehicle.

SUMMARY OF INVENTION

An automotive body includes a floor pan upon which a seat is mounted, a door for accessing a passenger compartment, and a cross member attached to the floor pan and extending laterally under the floor pan. A longitudinally extending frame rail underlies the floor pan and the cross member and is connected with one end of a flexible tensile member fastened between the frame rail and the cross member such that lateral displacement of the door, the floor pan, and the cross member relative to the frame rail resulting from a side impact upon the door will be arrested by the flexible tensile member. The body structure further includes an outer rocker panel abutted by the door when the door is in a closed position, and an inner rocker panel which is joined to the outer rocker panel and to the floor pan. The door displaces the inner and outer rocker panels, as well as the floor pan and the cross member in response to a crushing side impact upon the door, such that the flexible tensile member is placed under tension by lateral displacement of the cross member relative to the frame rail.

The flexible tensile member is normally in an untensioned state, but is transitioned to a tensioned state in response to the lateral displacement of the door such that impact driven deformation of the door and floor pan is limited.

The flexible tensile member has a first end and a second end, with the first end being fastened to the frame rail, and a second end attached to an inboard location of the cross member.

The attachment of the flexible tensile member to the frame rail may be located upon either an inboard face of the frame rail, or upon an outboard face of the frame rail. In either case, the tensile member will pass inboard of the frame rail and extend generally horizontally and inboard to a fastening location upon the cross member.

The flexible tensile member used in the present system may comprise either a non-metallic or metallic cable, or other types of flexible tensile members, both metallic and non-metallic, as well as composites known to those skilled in the art and suggested by this disclosure.

According to another aspect of the present invention, a method for limiting the deformation of an automotive vehicle body in response to a laterally directed impact load includes the steps of providing a passenger compartment door abutting a rocker panel assembly when the door is in a closed position, with the rocker panel assembly being joined to a floor pan of the passenger compartment, and providing at least one cross member attached to the floor pan and extending laterally under the floor pan. The present method further includes the steps of providing a frame rail extending longitudinally under the floor pan and under the cross member, and, finally providing a flexible tensile member extending inboard from the frame rail to the cross member, with the flexible tensile member having a first end fastened to the frame rail and the second end fastened to the cross member such that the tensile member will be caused to transition from a normally untensioned state to a tensioned state in the event that the door, the rocker panel assembly and the floor pan are subjected to crushing lateral displacement sufficient to displace the cross member relative to the frame rail.

In a preferred embodiment, a plurality of cross members and flexible tensile members will be employed according to the present invention.

It is an advantage of the present invention that a greater side impact load may be resisted with certain automotive vehicle bodies.

It is a further advantage of the present invention that this system allows energy management of a side impact to utilize the resistive strength incorporated in a vehicle's frame rail.

It is a further advantage of the present invention that a system according to this invention allows a side intrusion body management system to utilize the strength incorporated in underbody cross members, combined with the strength incorporated in vehicle frame rails.

Other advantages, as well as objects and features of the present invention, will become apparent to the reader of this specification.

DETAILED DESCRIPTION

Figure 1:
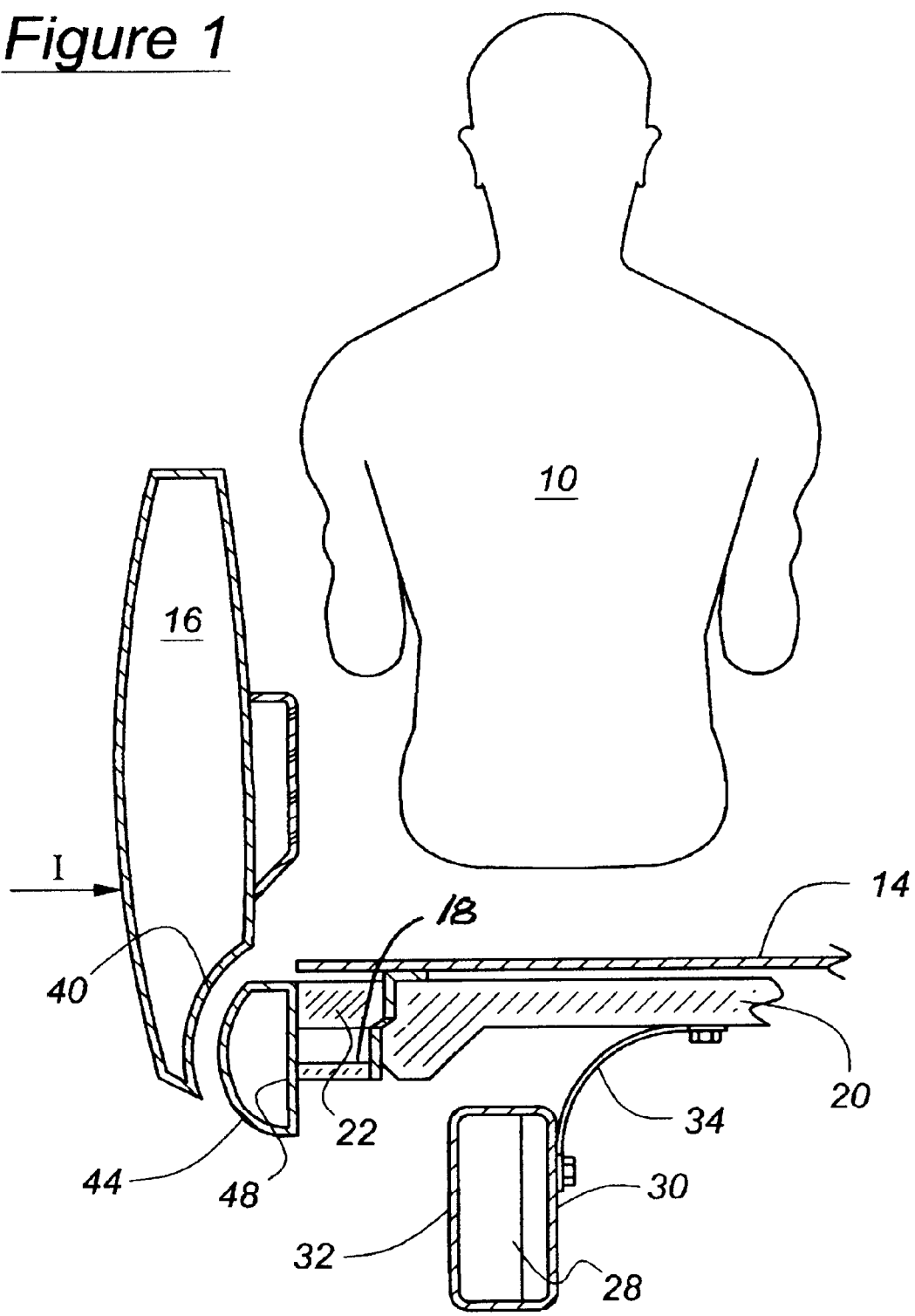
FIG. 1 is a schematic representation of an occupant seated within a vehicle body having an impact control system according to the present invention.

As shown in FIG. 1, vehicle occupant 10 is seated in a vehicle having a floor pan 14 which is joined to cross member 20. Floor pan 14 is adapted to support a seat (not shown). Door 16 provides access to the passenger compartment within which occupant 10 is seated. Cross member 20 is attached to floor pan 14 and extends laterally under floor pan 14. Longitudinally extending frame rail 28 acts as a basic support member for the vehicle's body, including floor pan 14, cross member 20 and the bodywork in general. Those skilled in the art will appreciate in view of this disclosure that the various Figures show only one side of a vehicle; because the vehicle would in most cases be generally symmetrical about a longitudinal centerline, a pair of frame rails 28 would normally be incorporated in the vehicle.

Door 16 has inner panel 40 which closes upon outer rocker panel 44, which is in turn backed by inner rocker panel 48. Inner rocker panel 48 in the preferred embodiment, abuts cross member extension 22 which extends between inner rocker panel 48 and an outboard end of cross member 20. Those skilled in the art will appreciate in view of this disclosure that floor pan 14, inner rocker panel 48, and outer rocker panel 44, as well as the other structural components described herein could be fabricated from welded, bonded or mechanically fastened metallic and non-metallic materials known as being suitable for automotive bodies.

Figure 2:
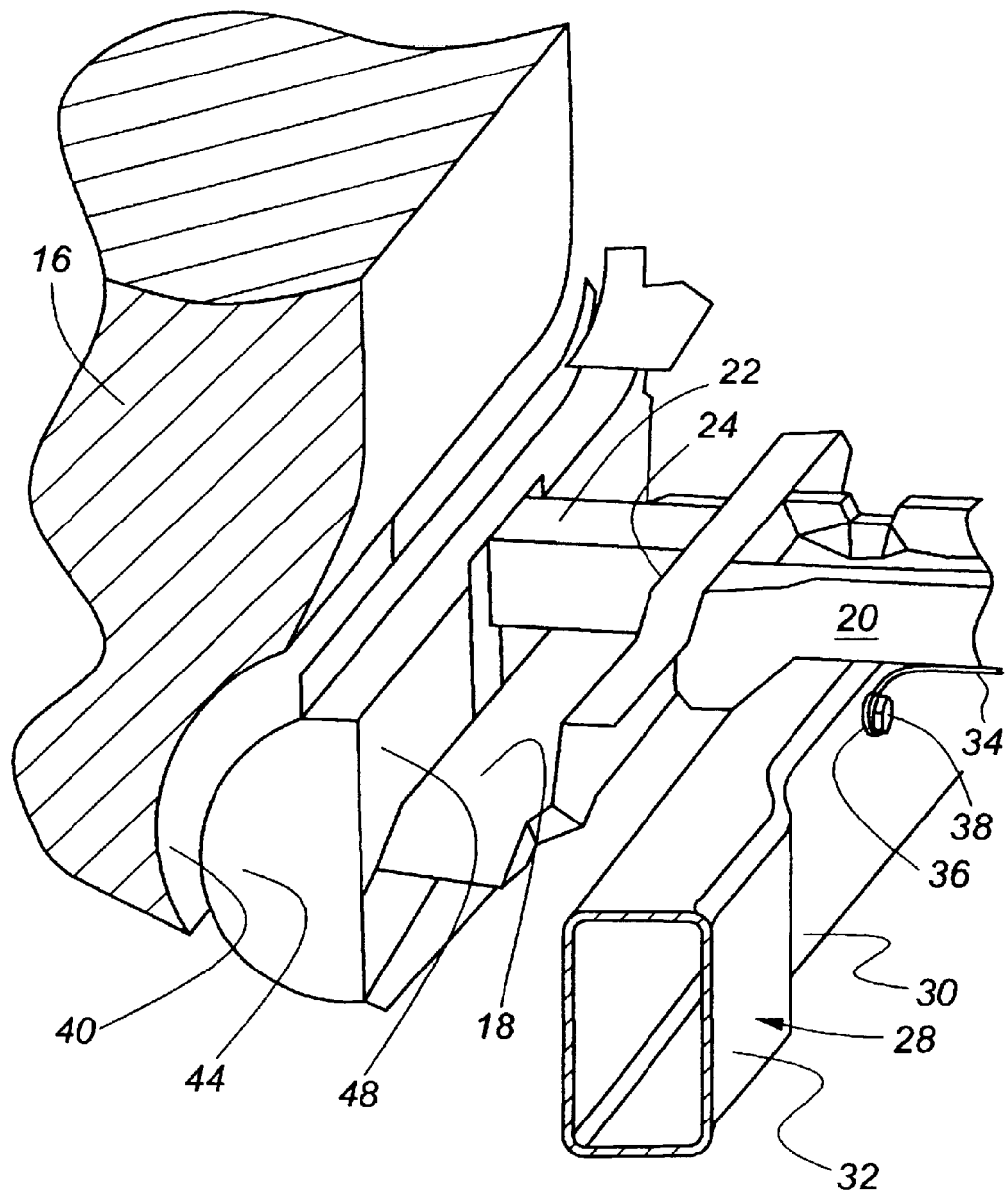
FIG. 2 is a perspective view illustrating various structures within an automotive body having an impact control system according to the present invention.

As further shown in FIG. 1, flexible tensile member 34 is positioned on inboard face 30 of frame rail 28 and extends to a lower portion of cross member 20. FIG. 2 shows a perspective view of the arrangement illustrated in FIG. 1. FIG. 2 shows with particularity door inner panel 40, which abuts outer rocker panel 44. Inner rocker panel 48 is also shown as being joined to cross member extension 22, which abuts vertical section 24 of lower floor pan 18. FIG. 2 also shows a mounting point for flexible tensile member 34 on the inboard face 30 of frame rail 28. FIG. 2 shows that flexible tensile member 34 is mounted by means of an eyelet 36 and bolt 38. Those skilled in the art will appreciate in view of this disclosure, however, that other types of mounting arrangements could be used for the purpose of fastening flexible tensile member 34 to both frame rail 28 and to cross member 20.

Figure 3:
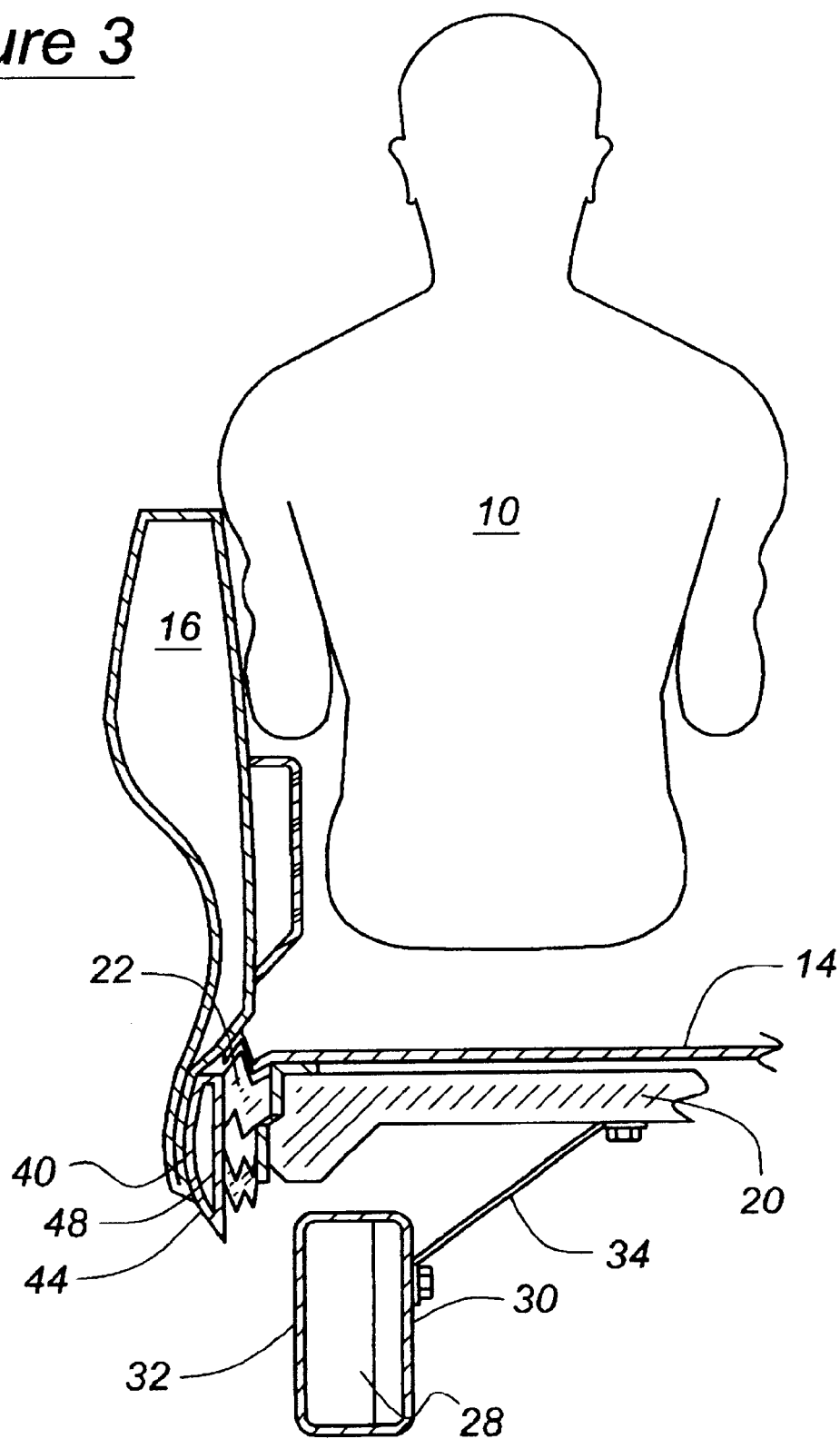
FIG. 3 is similar to FIG. 1 but shows the embodiment of FIG. 1 having been laterally displaced following impact upon the vehicle's door.

FIG. 1 shows a vehicle body before impact I has displaced the various panels and design elements, as shown following impact in FIG. 3. In contrast with FIG. 1, FIG. 3 shows that door 16, outer rocker panel 44 and inner rocker panel 48, as well as cross member extension 22, floor pan 14 and cross member 20 have all been displaced relative to frame rail 28 because of the crushing side impact upon door 16. This crushing impact causes flexible tensile member 34 to be transitioned from an untensioned or slack state as shown in FIG. 1, to the tensioned state illustrated in FIG. 3.

Once flexible tensile member 34 has been tensioned, further displacement of door 16 and the other crushable structures would require deformation of frame rail 28. Because frame rail 28 is far stiffer than any of the other cited structures, frame rail 28 and flexible tensile member 34 will work together to severely limit the further impact driven deformation of floor pan 14.

Figure 4:
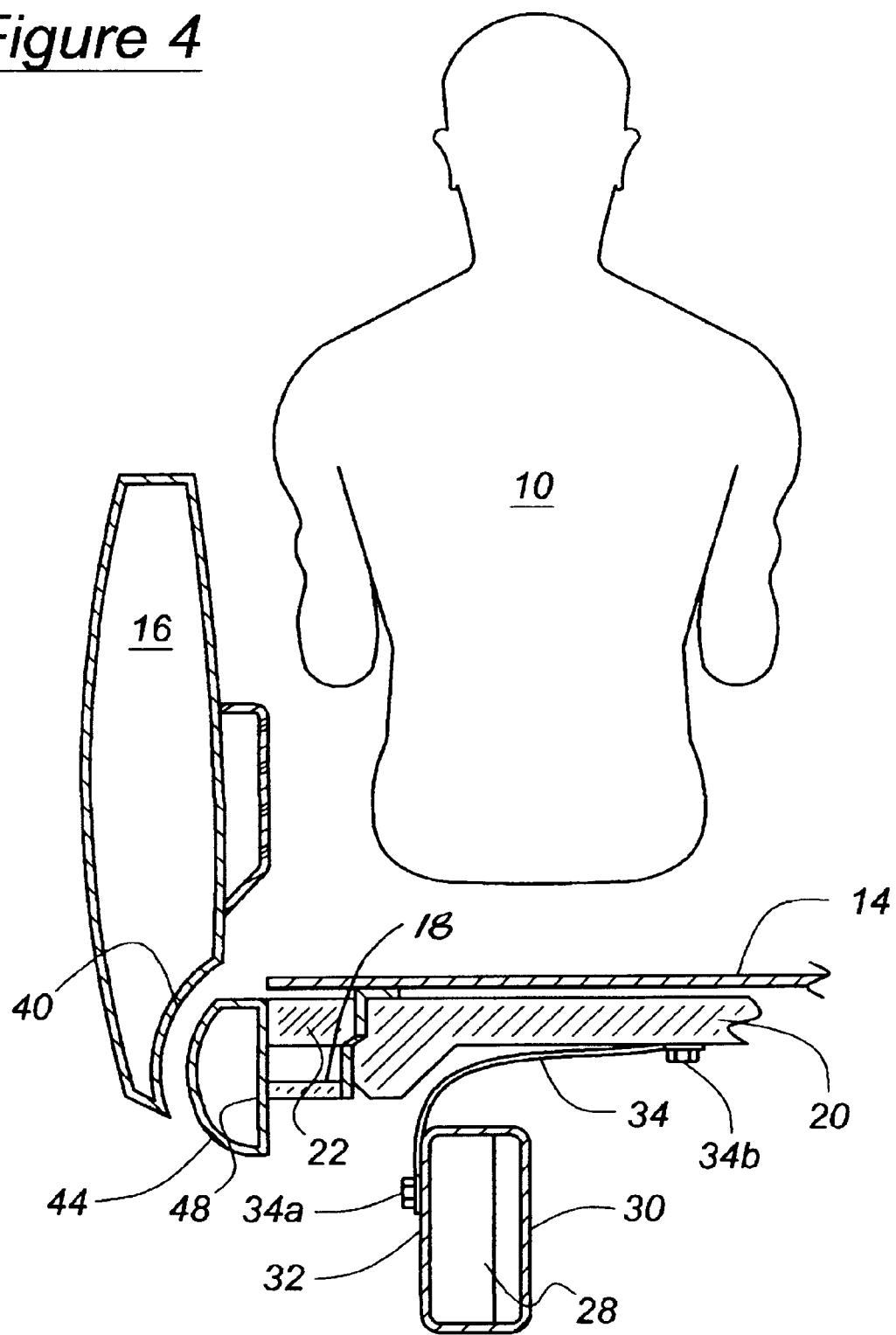
FIG. 4 illustrates a second embodiment of a side impact control system according to present invention shown in a untensioned state before side impact.

In the embodiment of FIG. 4, flexible tensile member 34 is fastened at its outboard end 34a to the outboard face 32 of frame rail 28; flexible tensile member 34 passes over frame rail 28 and extends generally horizontally inboard and is fastened at its second end, 34b, upon cross member 20. It is important that flexible tensile member 34 extend generally horizontally so as to provide a maximum restraining capability against displacement of the vehicle's body versus frame rail 28.

Figure 5:
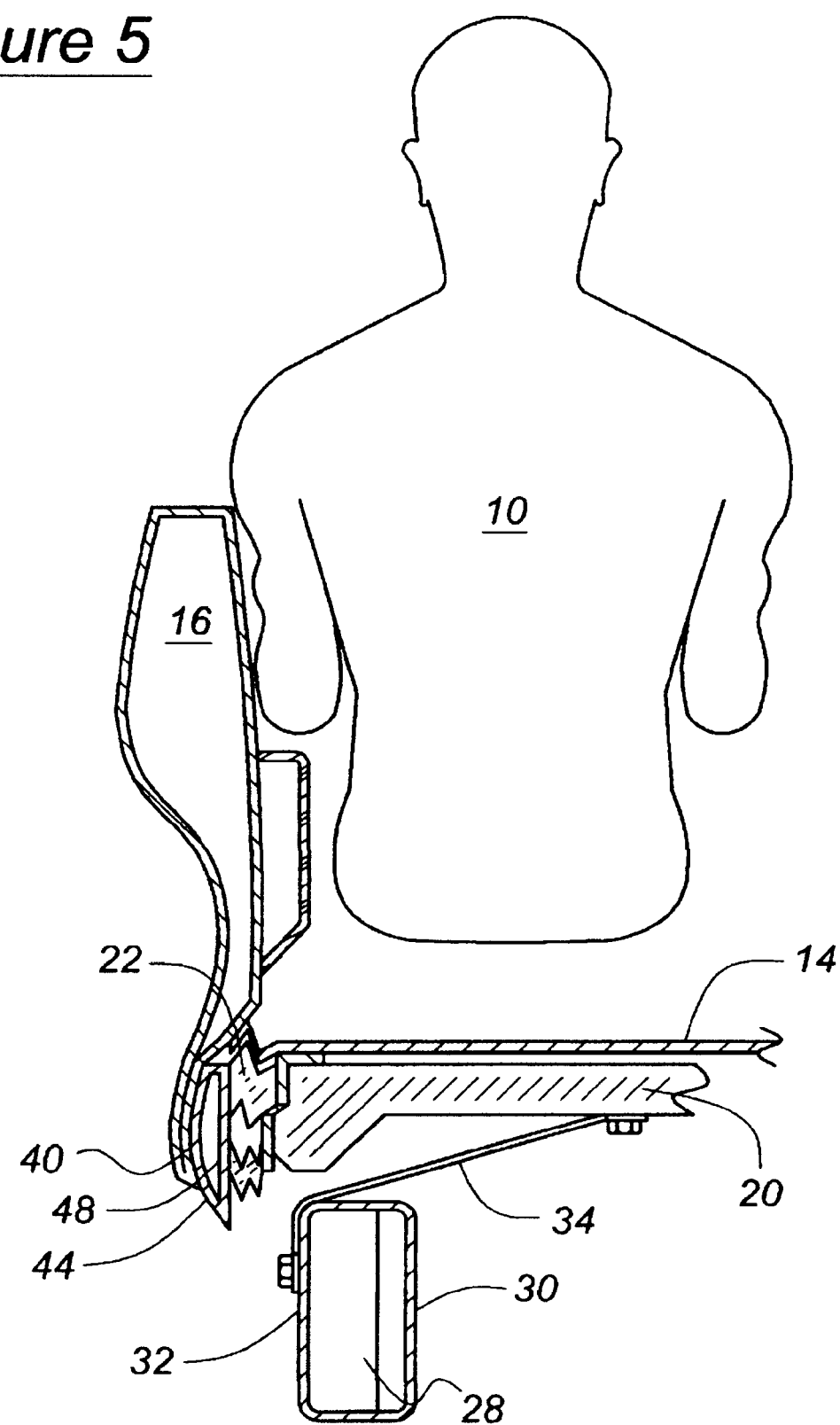
FIG. 5 illustrates the embodiment of FIG. 4 in post-impact state in which a flexible tensile member is extended so as to arrest or limit the lateral displacement of the door and rocker panel resulting from side impact.

FIG. 5 illustrates flexible tensile member 34 in a tensioned state following the imposition of a crushing load against door 16 and rocker panel assembly 44, 48. It is important to note that flexible tensile member 34 is normally in an untensioned or slack state and this prevents flexible tensile member 34 from interfering with the vibration isolation that is desired between frame rail 28 and the body of the vehicle incorporating cross member 20. Because flexible tensile member 34 is normally slack, the isolators (not shown) which are imposed between the body of the vehicle and frame rail 28 will be permitted to function in normal fashion and retuning of the isolators will not be needed. This provides an advantage in that an existing automotive body will not normally need to be redesigned to accommodate the present side impact control system.

The present invention is useful for controlling the crushing force of an impact upon not only vehicle doors, but also other exterior structures enclosing a portion of a passenger compartment. Such exterior structures may comprise for example a fixed quarter panel enclosing a portion of the seating area of a vehicle, or other exterior parts of an automotive body subject to crushing displacement in a direction perpendicular to a high strength frame member.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An automotive body comprising:
    a floor pan adapted to support a seat;
    a door for accessing a passenger compartment;
    a cross member attached to the floor pan and extending laterally under the floor pan;
    a longitudinally extending frame rail underlying the floor pan and cross member; and
    a flexible tensile member fastened between said frame rail and said cross member such that lateral displacement of said door relative to said frame rail resulting from a side impact upon the door is arrested by said flexible tensile member.

2. An automotive body according to claim 1, further comprising an outer rocker panel abutted by said door when the door is in a closed position and an inner rocker panel which is joined to the outer rocker panel and to said floor pan, with said door displacing said inner and outer rocker panels, said floor pan, and said cross member in response to a crushing side impact upon the door, such that said flexible tensile member is placed under tension by lateral displacement of said cross member.

3. An automotive body according to claim 1, wherein said flexible tensile member is normally in an untensioned state.

4. An automotive body according to claim 1, wherein said flexible tensile member is in an untensioned state during normal operation of a vehicle equipped with said automotive body, with said member being transitioned to a tensioned state in response to said lateral displacement of said door, such that the impact driven deformation of the door and floor pan is limited.

5. An automotive body according to claim 1, wherein said flexible tensile member is fastened to an inboard face of said frame rail, with said tensile member extending further inboard to a fastening location upon said cross member.

6. An automotive body according to claim 1, wherein said flexible tensile member has an outboard end fastened to an upper inboard face of said frame rail and an inboard end fastened to said cross member.

7. An automotive body according to claim 1, wherein said flexible tensile member is fastened to an outboard face of said frame rail, with the tensile member passing over said frame rail and extending generally horizontally inboard to a fastening location upon said cross member.

8. An automotive body according to claim 1, wherein said flexible tensile member comprises a metallic cable.

9. A method for limiting the deformation of a automotive vehicle body in response to a laterally directed impact load, comprising the steps of:

providing a passenger compartment door abutting a rocker panel assembly when the door is in a closed position, with the rocker panel assembly being joined to a floor pan of the passenger compartment;

providing at least one cross member attached to the floor pan and extending laterally under the floor pan;

providing a frame rail extending longitudinally under the floor pan and said at least one cross member; and providing a flexible tensile member extending inboard from said frame rail to said cross member, with said flexible tensile member having a first end fastened to said frame rail and a second end fastened to said cross member such that said tensile member will be caused to transition from a normally untensioned state to a tensioned state in the event that the door, the rocker panel assembly, and the floor pan are subjected to crushing lateral displacement sufficient to displace the cross member relative to said frame rail.

10. A method according to claim 8, further comprising the step of joining an outboard end of said cross member with said rocker panel assembly.

11. An automotive body comprising:

a floor pan adapted to support a seat; an exterior structure enclosing a portion of a passenger compartment;

a rocker panel assembly abutted by a portion of said exterior structure, with said rocker panel assembly being joined to said floor pan;

at least one cross member attached to the floor pan and extending laterally under the floor pan, with said cross member extending to and joined with said rocker panel assembly;

a longitudinally extending frame rail underlying the floor pan and cross member; and a flexible tensile member extending generally horizontally between said frame rail and said cross member such that lateral displacement of said exterior structure, said rocker panel and said cross member relative to said frame rail, resulting from a side impact upon the exterior structure will transform the tensile member from a untensioned state to a tensioned state, thereby resisting further lateral displacement of the exterior structure, the rocker panel, and the cross member relative to the frame rail.

12. An automotive body according to claim 10, wherein said flexible tensile member is fastened to an inboard face of said frame rail, with said tensile member extending further inboard to a fastening location upon said cross member.

13. An automotive body according to claim 10, wherein said flexible tensile member has an outboard end fastened to an upper inboard face of said frame rail and an inboard end fastened to said cross member.

14. An automotive body according to claim 10, wherein said flexible tensile member is fastened to an outboard face of said frame rail, with the tensile member passing over said frame rail and extending horizontally inboard to a fastening location upon said cross member.

15. An automotive body according to claim 10, wherein said flexible tensile member comprises a cable.

16. An automotive body according to claim 10, wherein said flexible tensile member comprises a metallic cable.

17. An automotive body according to claim 10, further comprising a plurality of additional cross members and a plurality of additional flexible tensile members, with each of said flexible tensile members being attached to at least one of said cross members, as well as to said frame rail.

* * * * *